United States Patent [19]
Yoshioka

[11] Patent Number: 6,135,563
[45] Date of Patent: Oct. 24, 2000

[54] INFLATABLE BELT

[75] Inventor: Daisuke Yoshioka, Shiga, Japan

[73] Assignee: Takata Corporation, Tokyo, Japan

[21] Appl. No.: 09/327,547

[22] Filed: Jun. 8, 1999

[30] Foreign Application Priority Data

Jun. 8, 1998 [JP] Japan ................................ 10-159295

[51] Int. Cl.$^7$ ............................ A62B 35/00; B60R 22/12
[52] U.S. Cl. ........................... 297/470; 297/471; 280/733
[58] Field of Search ..................................... 297/470, 471, 297/216.1; 280/733, 736

[56] References Cited

U.S. PATENT DOCUMENTS

| | | | |
|---|---|---|---|
| 3,430,979 | 3/1969 | Terry et al. | 297/471 X |
| 3,801,156 | 4/1974 | Granig | 297/471 X |
| 3,844,581 | 10/1974 | Fox | 297/471 X |
| 3,848,887 | 11/1974 | Fox | 297/471 X |
| 3,888,503 | 6/1975 | Hamilton . | |
| 5,303,953 | 4/1994 | Kamiyama et al. | 280/733 |
| 5,346,250 | 9/1994 | Kamiyama | 280/733 |
| 5,354,096 | 10/1994 | Tanaka et al. | 280/733 |
| 5,383,713 | 1/1995 | Kamiyama et al. | 280/733 X |
| 5,390,953 | 2/1995 | Tanaka et al. | 280/733 |
| 5,445,411 | 8/1995 | Kamiyama et al. | 280/733 |
| 5,465,999 | 11/1995 | Tanaka et al. | 280/733 |
| 5,466,002 | 11/1995 | Tanaka et al. | 280/733 |
| 5,839,753 | 11/1998 | Yaniv et al. | 280/733 |
| 5,947,513 | 9/1999 | Lehto | 280/733 |
| 6,007,092 | 12/1999 | Martz | 280/733 |
| 6,010,151 | 1/2000 | Honda | 280/733 |
| 6,019,388 | 2/2000 | Okazaki et al. | 280/733 |

FOREIGN PATENT DOCUMENTS 5-85301  4/1993  Japan ............................. B60R 22/12

*Primary Examiner*—Peter M. Cuomo
*Assistant Examiner*—Rodney B. White
*Attorney, Agent, or Firm*—Foley & Lardner

[57] ABSTRACT

An inflatable belt includes an envelope-shaped or elongated belt body, which is folded in a long band-shaped configuration, and a cover enclosing the belt body. The belt body is made of a single piece of rectangular base fabric. The rectangular base fabric is folded about a longitudinal return line. The folded halves are then sewn about an outer periphery of an inflatable area so as to have an envelope-shaped or elongated configuration. Thus, the inflatable belt has a uniform thickness and feels better to the vehicle occupant when the inflatable belt is in contact with the vehicle occupant. Also, the inflatable belt has a shorter stitching length, thereby reducing cost, improving productivity, and reducing or preventing gas leakage.

13 Claims, 5 Drawing Sheets

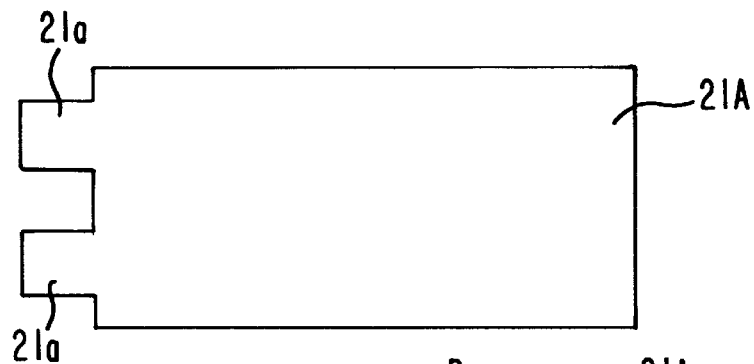
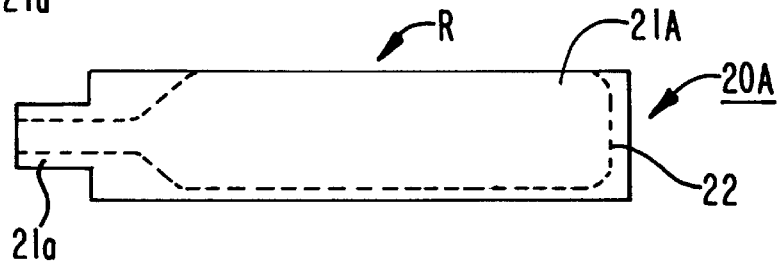
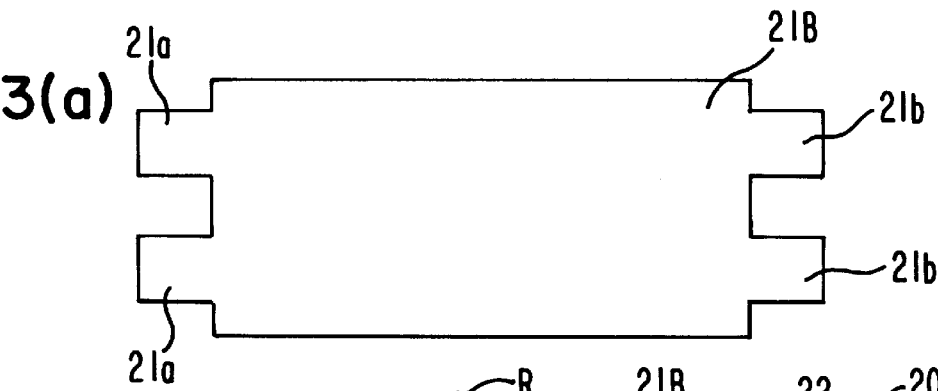
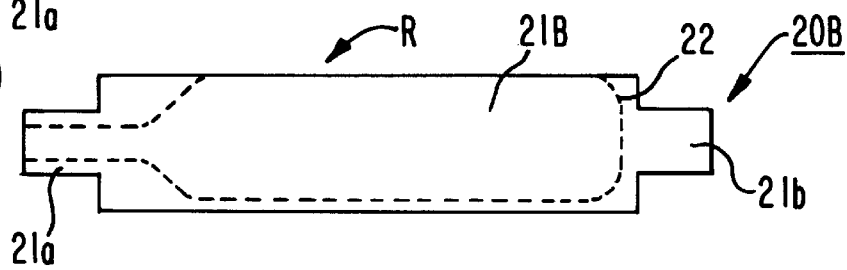

INFLATABLE BELT

BACKGROUND OF THE INVENTION

1. Field of the Invention

The present invention relates to a seat belt for protecting a vehicle occupant during a vehicle collision and, more particularly, to an inflatable belt capable of being inflated with gas.

2. Description of the Related Art

An inflatable belt device of this type is disclosed in Japanese Unexamined Patent Publication H05-85301 and is shown in FIGS. 6(a) and 6(b). This passenger protective device 1 includes a shoulder belt 2 extending diagonally from the right side to the left side of a passenger, a lap belt 3 extending from the right side to the left side of the passenger, a buckle 4 fixed to, for example, a vehicle floor, a tongue 5 to be inserted into and engaged with the buckle 4 when the passenger wears the belt, and an intermediate guide 6 for guiding the shoulder belt 2.

The shoulder belt 2 includes a webbing 2a, which is the same as a typical conventional seat belt, and an inflatable belt 2b connected to an end of the webbing 2a. The webbing 2a is slidably hung in the intermediate guide 6. The other end of the webbing 2a is connected to a shoulder belt retractor 7 with an emergency locking mechanism (ELR), which is fixed to the vehicle body. The webbing 2a is arranged such that it is wound into the shoulder belt retractor 7.

The inflatable belt 2b is positioned so that it contacts the passenger and is connected to the tongue 5 at an end opposite to the end connected to the webbing 2a. The lap belt 3 is composed of a webbing, which is the same as a typical conventional seat belt, having one end is connected to the tongue 5 and the other end connected to a lap belt retractor 8 (ELR), which is fixed to the vehicle body. A gas generator 9 is connected to the buckle 4. The gas generator 9 is actuated in emergency situations, e.g., vehicle collisions, to generate high-pressure gas. The tongue 5 and the buckle 4 are each provided with passages for introducing gas from the gas generator 9 into the inflatable belt 2b.

The inflatable belt 2b of the shoulder belt 2 includes a belt body 2c formed in an envelope-like shape and a cover 2d. The belt body 2c is folded, shown in solid lines in FIG. 6(b), and then covered by the cover 2d. The ends of the cover 2d are then connected to each other by stitching 2e so that the inflatable belt 2b is maintained in a band-like configuration. The stitching 2e of the cover 2d is easily torn by the force of the shoulder belt 2 expanding when the gas generator 9 is actuated so that the inflatable belt 2b is deployed, shown by a two-dot chain line in FIG. 6(b).

The belt body 2c is made of, for example, rubber coated fabric and the cover 2d is made of a flexible knit with excellent stretchability.

FIGS. 5(a) through 5(d) are perspective views illustrating the manufacturing process of a conventional inflatable belt. Conventionally, two pieces of base fabrics 11, 12 are first cut to correspond to the configuration of a belt body being manufactured. The base fabrics 11, 12 are then superposed on each other (FIG. 5(a)) and sewn together along their peripheries to make an envelope-like or elongated belt body 14 (FIG. 5(b), numeral 13 designates stitching). After that, the belt body 14 is longitudinally folded into a band-like configuration (FIG. 5(c)). Last, the belt body 14 is accommodated in a knit cover 15 (FIG. 5(d)), thereby making the inflatable belt 16.

The belt body 14 made from superposing the base fabrics 11, 12, which were cut in a special configuration to correspond to the configuration of the belt body and then sewn together, includes areas A, B, C, which have different volumes (due to the changing widths of the base fabrics 11, 12). Therefore, the folded body made by longitudinally folding the belt body 14 has a non-uniform thickness. That is, the folded body is thin around both ends and thick around the longitudinal center. Accordingly, the inflatable belt 16, which includes the above folded body and the knit cover 15, also has a non-uniform thickness.

An inflatable belt having such a non-uniform thickness feels poorly to a vehicle occupant when the belt contacts his/her chest and/or abdomen during driving.

The conventional belt body is constructed by sewing substantially the entirety of the peripheries of the superposed base fabrics. As a result, the length of the stitching is long, thus increasing the cost and also decreasing the productivity.

Such long stitching is undesirable not only because of the increased cost and decreased productivity, but also because gas may leak at the sewn portions during inflation and deployment of the inflatable belt.

These difficulties or problems with the current alternatives are not intended to be exhaustive, but are many which tend to reduce the desirability of known seat belts. Other notable problems may exist; those presented above, however, should be sufficient to demonstrate that devices appearing in the past are amenable to worthwhile improvement.

SUMMARY OF THE INVENTION

Accordingly, it is a general object of the invention to provide a method of manufacturing an inflatable belt that will obviate or minimize the above difficulties.

It is an object of the present invention to provide an inflatable belt having a uniform thickness.

It is another object of the invention to provide an inflatable belt that feels good when it contacts the vehicle occupant.

It is still another object of the present invention to provide an inflatable belt having a reduced stitching length so as to reduce cost, improve productivity, and prevent gas leakage.

A preferred embodiment, which is intended to accomplish at least some of the above objects, includes an elongated belt body into which a gas is introduced; and a cover enclosing the belt body, wherein the belt body includes a piece of rectangular fabric folded about a return line, which extends in a longitudinal direction of the belt, and connecting the folded portions to each other.

Additional objects and advantages of the invention will be set forth in the following description of the preferred embodiments and, in part, will be obvious from the description or through practicing the invention. The objects and advantages may be realized through the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description, serves to explain the principles of the invention.

FIGS. 2(a)–2(b) are perspective views illustrating the manufacturing process of an envelope-like or elongated belt body according to a second embodiment of the present invention.

FIGS. 3(a)–3(b) are perspective views illustrating the manufacturing process of an envelope-like or elongated belt body according to a third embodiment of the present invention.

DETAILED DESCRIPTION OF THE PREFERRED EMBODIMENTS

The inflatable belt of the present invention includes an envelope-like or elongated belt body folded in a long band like configuration and a cover enclosing the belt body. The present invention, however, employs a base fabric having a rectangular shape for manufacturing the belt body.

Figure 1A:
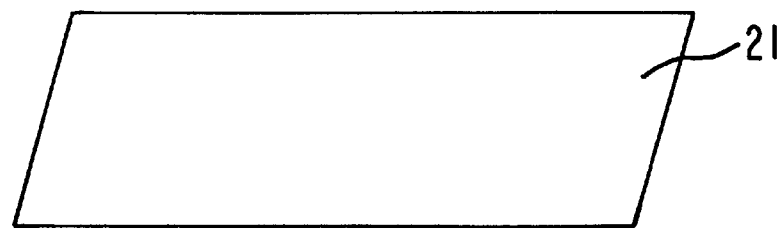
FIGS. 1(a)–1(d) are perspective views illustrating the manufacturing process of an envelope-like or elongated belt body according to a first embodiment of the present invention.
Figure 1B:
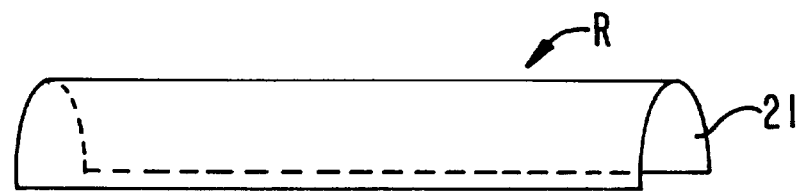
Figure 1C:
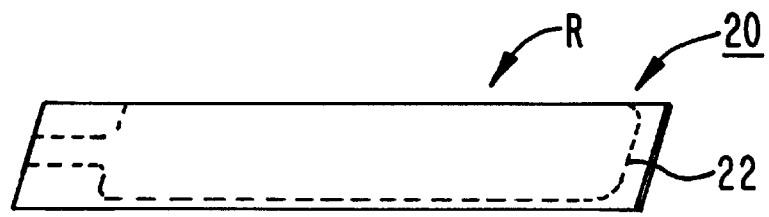
Figure 1D:
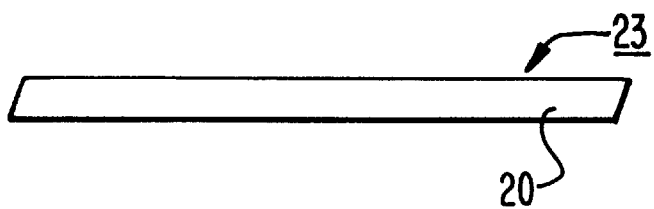

Referring now to the drawings and initially to FIG. 1(a), there will be seen a rectangular base fabric 21. As shown in FIGS. 1(a)–1(b), the rectangular base fabric 21 is folded about a return line R. Next, as shown in FIG. 1(c), the periphery of the desired inflation area is sewn with stitching 22, without sewing the fold and return portion R. Thus, the first longitudinal edge of the belt body 20 is the fold and return line R and the second longitudinal edge is a connected edge. The belt body 20 is then folded to achieve the folded belt body 23 of FIG. 1(d).

In this method of constructing the belt body 20, the fold and return portion R serves as a longitudinal side of the envelope, thereby eliminating the sewing about this portion and thus decreasing the length of stitching compared to the conventional belt body.

The folded body 23, which results from belt body 20, has a uniform thickness because it is made by folding a rectangular base fabric 21.

Each of belt bodies 20A, 20B shown in FIGS. 2(a), 2(b) and FIGS. 3(a), 3(b) is substantially the same as the belt body 20 of FIGS. 1(a)–1(d), except that a rectangular base fabric 21A, 21B having projections 21a, 21b extending outward from one end or both ends of the base fabric 21A, 21B is used a the base fabric. The projections 21a, 21b preferably extend symmetrically about the return line.

With either of these belt bodies 20A, 20B, the folded body has a uniform thickness about the major part. Also, the fold and return portion R serves as one of the longitudinal sides, thereby decreasing the length of the stitching and thus reducing cost and increasing productivity.

Figure 4A:
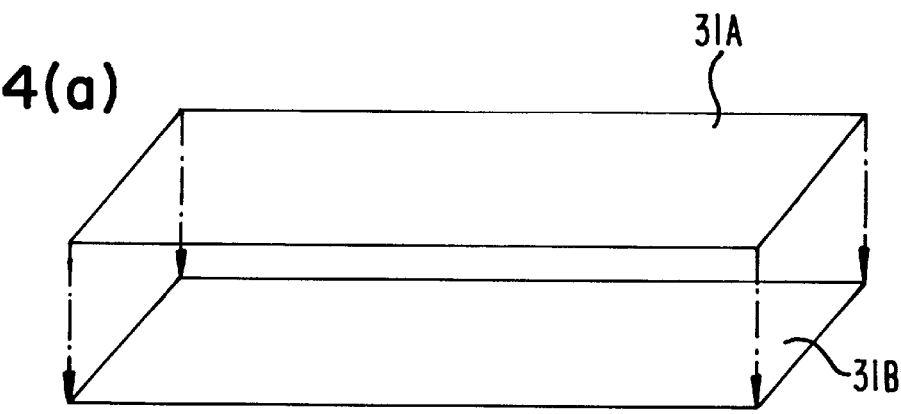
FIGS. 4(a)–4(c) are perspective views illustrating the manufacturing process of an envelope-like or elongated belt body according to a fourth embodiment of the present invention.
Figure 4B:
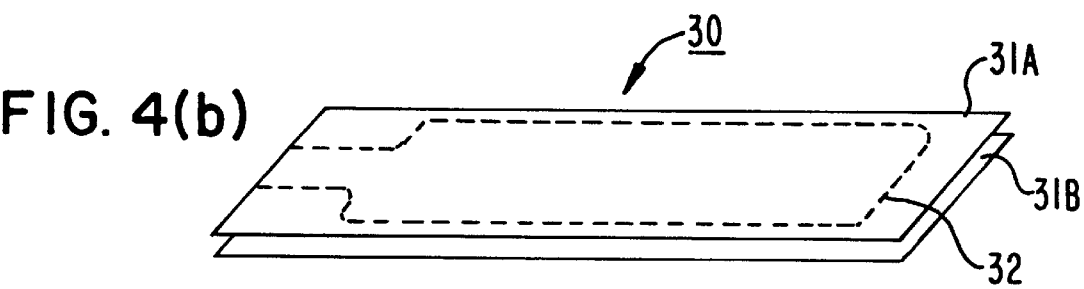
Figure 4C:
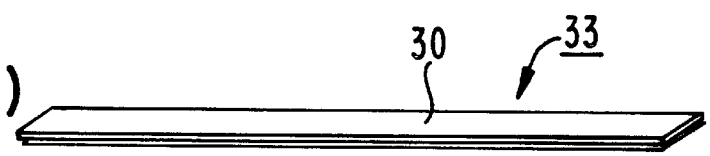
Figure 5A:
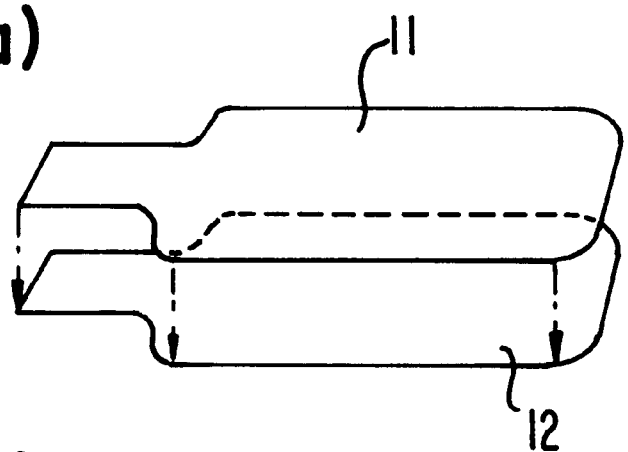
FIGS. 5(a)–5(d) are perspective views illustrating the manufacturing process of a conventional inflatable belt.
Figure 5B:
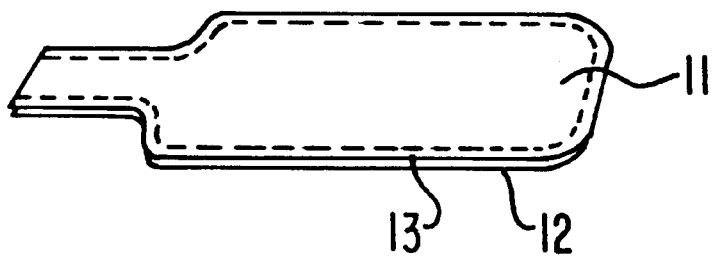
Figure 5C:
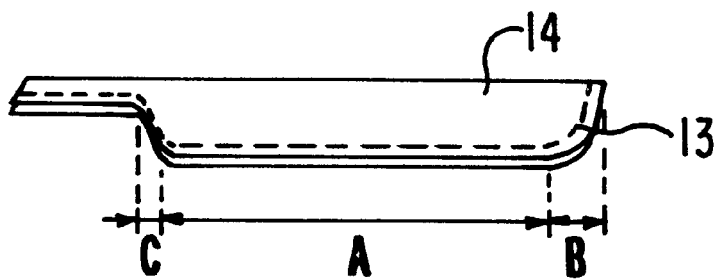
Figure 5D:
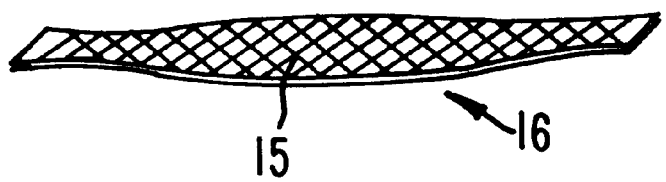
Figure 6A:
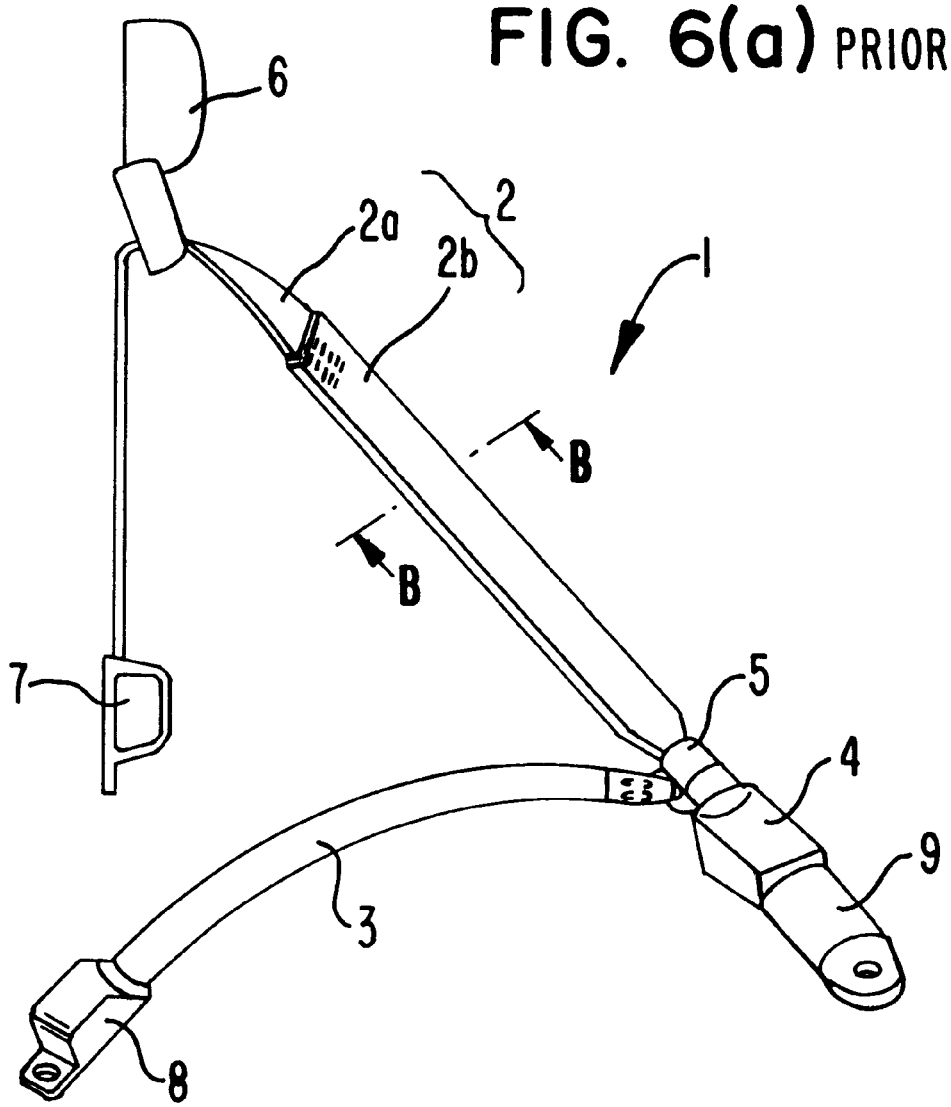
FIG. 6(a) is a general perspective view showing a conventional seat belt system with an inflatable belt and FIG. 6(b) is an enlarged view showing a section taken along a line B—B of FIG. 6(a).
Figure 6B:
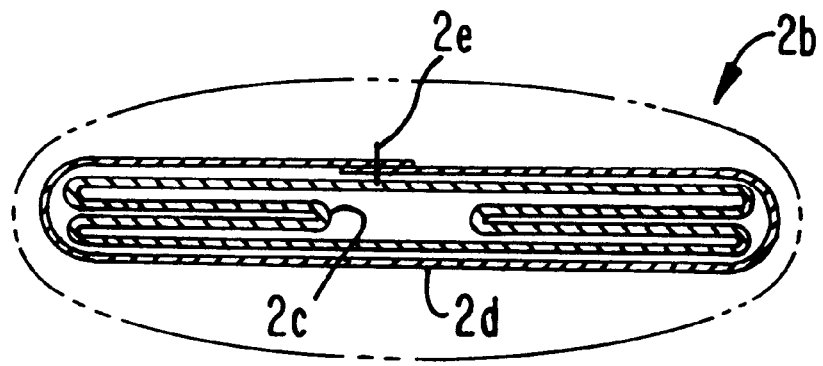

Referring now to FIGS. 4(a)–4(c), a belt body 30 is made by superposing two rectangular base fabrics 31A, 31B as shown in FIG. 4(a). The periphery of the desired inflatable area is then sewn with stitching 32. The belt body 30 is then folded into a band-like configuration 33.

Though the length of stitching according to the belt body 30 is the same as that of the conventional belt body, the folded body 33 of this belt body 30 has a uniform thickness because it is made by folding the two rectangular base fabrics 31A, 31B. Thus, the folded body 33 feels better to the vehicle occupant than the conventional body.

Even when two base fabrics are superposed and sewn together, an improvement is obtained simply by using base fabrics that are rectangular. Further, the base fabrics may have projections on one end or both ends thereof.

As described in the above, the inflatable belt of the present invention has a uniform thickness and thus has an improved feel to the occupant, thereby providing improved comfort to the vehicle occupant wearing the inflatable belt.

Particularly, the inflatable belt of FIGS. 1–3 allows the length of stitching to be short, thereby reducing the cost, improving the productivity, and also increasing the air tightness to prevent gas leakage during the inflation and deployment of the inflatable belt.

The inflatable belts of FIGS. 1–4 are components of a conventional seat belt system for protecting an occupant in a vehicle seat. Such a system includes an inflatable belt, which is inflated when gas is introduced inside. The inflatable belt has an envelope-like or elongated belt body, into which gas is introduced, and a cover enclosing the belt body.

In an inflatable belt according to the invention, the belt body is constructed from a single piece of rectangular fabric folded about a return line, which extends in the longitudinal direction of the belt. The halves of the rectangular fabric are then connected to each other. In another embodiment, two separate pieces of rectangular fabric are used, which are superposed on each other and then connected to each other.

In the present invention, the folded body has a uniform thickness because the belt body is made from a rectangular base fabric.

In particular, in the inflatable belt as shown in FIGS. 1–3, because one piece of rectangular fabric is employed which is folded, stitching at the fold and return portion is eliminated so that the length to be sewn is decreased, thereby reducing the manufacturing cost and improving the productivity. Because the possibility of gas leakage at the fold portion is less than that at the sewn portions, using the fold portion improves the gas tightness to prevent gas leakage.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

Priority document, Japanese Patent Application No. H10-159295, filed Jun. 8, 1998, is hereby incorporated by reference.

This application is one of seven copending applications:

| U.S. Ser. No. | U.S. Filing Date | Our Docket No. | Japanese Application No. |
| --- | --- | --- | --- |
| 09/327,481 | June 8, 1999 | 086142/0246 | H10-159293 |
| 09/327,451 | June 8, 1999 | 086142/0247 | H10-159296 |
| 09/327,547 | June 8, 1999 | 086142/0248 | H10-159295 |
| 09/327,546 | June 8, 1999 | 086142/0249 | H10-159297 |
| 09/328,289 | June 9, 1999 | 086142/0250 | H10-160777 |
| 09/328,363 | June 9, 1999 | 086142/0251 | H10-160780 |
| 09/328,890 | June 9, 1999 | 086142/0253 | H10-160778 and H10-160779 |

The instant application hereby incorporates by reference the entire specification including claims and abstract and the drawings of each of the other six applications.

What is claimed is:

1. An inflatable belt for a motor vehicle, the inflatable belt comprising:

an elongated belt body into which a gas is to be introduced; and a cover enclosing the belt body;

wherein the belt body includes a piece of rectangular fabric with a first longitudinal end and a second longitudinal end folded about a return line, which extends in a longitudinal direction of the belt, the first longitudinal end and the second longitudinal end being connected to each other.

2. An inflatable belt as claimed in claim 1, wherein the piece of rectangular fabric has two projections extending from one of the longitudinal ends of the fabric symmetrically about the return line.

3. An inflatable belt as claimed in claim 2, wherein the piece of rectangular fabric has two projections extending from another of the longitudinal ends of the fabric symmetrically about the return line.

4. An inflatable belt as claimed in claim 1, wherein the belt body has a uniform thickness over the entire length of the belt body.

5. An inflatable belt for a motor vehicle, the inflatable belt comprising:

an elongated belt body into which gas is to be introduced; and a cover enclosing the belt body, wherein the belt body includes two pieces of superposed rectangular fabric connected to each other at a periphery of an inflatable area.

6. A method of making an inflatable belt, comprising the steps of:

providing a rectangular piece of fabric;

folding the rectangular piece of fabric about a return line to form two folded portions such that the return line forms a first longitudinal edge; and connecting the two folded portions together at a periphery to form a second longitudinal edge and two ends of an inflatable area.

7. A method of making an inflatable belt as claimed in claim 6, further comprising folding the connected portions again.

8. A method of making an inflatable belt as claimed in claim 6, wherein the two folded portions are connected with stitching.

9. An inflatable belt as claimed in claim 5, wherein the two pieces of rectangular fabric have a first longitudinal end and a second longitudinal end; and wherein the two pieces of rectangular fabric have projections extending from one of the longitudinal ends.

10. An inflatable belt as claimed in claim 9, wherein the pieces of rectangular fabric have projections extending from another of the longitudinal ends of the fabric.

11. A method of making an inflatable belt, comprising the steps of:

providing two identical rectangular pieces of fabric; and connecting the two rectangular pieces at a periphery of an inflatable area; and folding the connected fabric into a band configuration.

12. The method of claim 11, wherein the step of providing comprises providing the two rectangular pieces of fabric with a first longitudinal end and a second longitudinal end, and with projections extending from one of the longitudinal ends.

13. The method of claim 12, wherein the step of providing comprises providing the two rectangular pieces of fabric with projections extending from another of the longitudinal ends.

* * * * *